Feb. 18, 1930. E. W. RIEMENSCHNEIDER 1,747,602
INDEXING MACHINE
Filed July 29, 1926 2 Sheets-Sheet 1
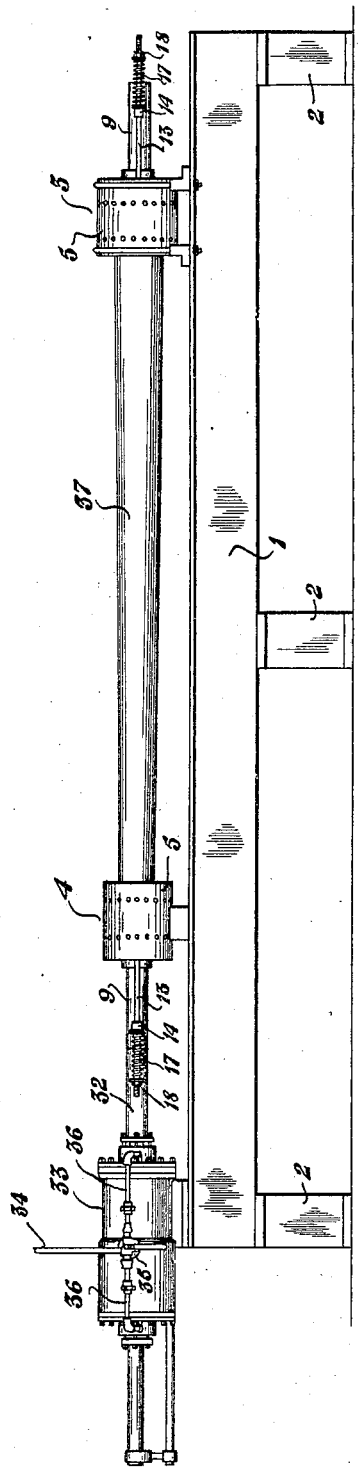
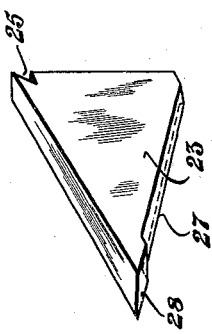
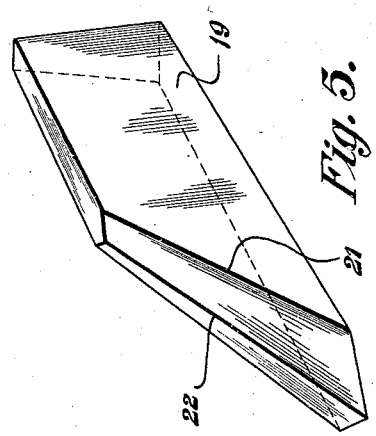
Inventor
E. W. Riemenschneider
By Frease and Bond
Attorneys

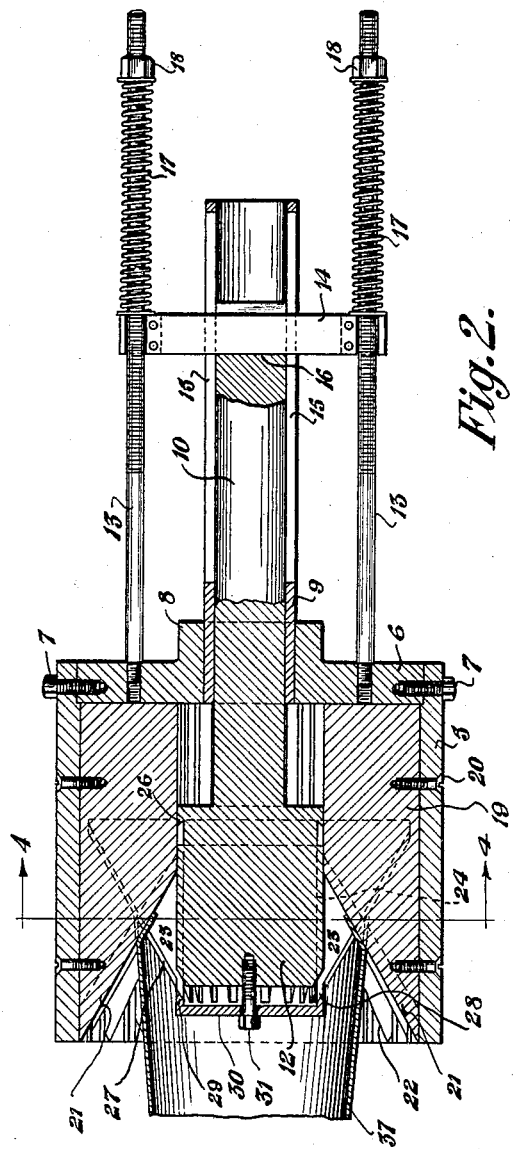

Patented Feb. 18, 1930

1,747,602

UNITED STATES PATENT OFFICE

EDMUND W. RIEMENSCHNEIDER, OF CANTON, OHIO, ASSIGNOR TO THE UNION METAL MANUFACTURING COMPANY, OF CANTON, OHIO, A CORPORATION OF OHIO

INDEXING MACHINE

Application filed July 29, 1926. Serial No. 125,773.

The invention relates to the manufacture of fluted tubular sheet metal columns, and more particularly to a machine for marking or indexing opposite ends of the tubes, to indicate the positions of the flutes.

In manufacturing fluted sheet metal columns it is customary to first form a tube of the necessary size, this tube being placed over a mandrel and the flutes formed therein, one at a time, by means of a roller die.

In order to provide for the proper number of flutes and the correct spacing of the same, it is necessary that each end of the tube be marked to indicate the positions of the flutes and this marking or indexing has formerly been done by hand. This is not only a tedious and slow operation but it frequently happens that the variation in the marking of opposite ends of the column results in an uneven spacing of the flutes.

The object of the present improvement is to provide a machine for automatically marking or indexing both ends of the tube simultaneously, thus considerably reducing the time and labor required for the operation and producing a correct spacing of the flutes.

An embodiment of the invention is illustrated in the accompanying drawings, in which Figure 1 is a side elevation of the improved indexing machine;

Fig. 2, an enlarged longitudinal sectional view through one of the indexing units;

Fig. 3, an end view of the unit;

Fig. 4, a section on the line 4—4, Fig. 2, and

Figs. 5 and 6, detail perspective views of the outer and inner marking blades.

Similar numerals indicate corresponding parts throughout the drawings.

The machine includes a suitable bed 1, mounted upon upright supports 2, and provided near one end with the fixed indexing unit, indicated generally at 3, a movable indexing unit 4, similar in construction to the fixed unit, being slidably mounted on the bed near the other end thereof.

As both of these units are of the same construction, only one is described in detail. Each unit consists of a sleeve head and a die head movable relatively longitudinally within the sleeve head, and each sleeve head comprises a hollow cylinder 5, an end wall 6 being fixed at its outer end as by screws 7 and provided with a central apertured boss 8, within which is fixed one end of a tube 9.

A shaft 10 is longitudinally slidably mounted through the tube and provided at its inner end with a die head 12. A pair of spaced guide rods 13 are fixed in the end wall 6 and have slidably mounted thereon a cross bar 14 which is located through diametrically opposed slots 15 in the tube 9 and through a notch 16 in the outer end of the shaft 10.

For the purpose of normally urging the shaft 10 toward the cylinder 5 a coil spring 17 is mounted upon each guide rod, being interposed between the bar 14 and a shoulder, such as the nut 18, located at the outer end portion of the guide rod.

A plurality of indexing or marking blades 19 are radially disposed within the sleeve head cylinder 5, being connected to the interior thereof as by screws 20. These blades are of sufficient width to permit the die head 12 to slide upon the inner edges thereof as illustrated in Fig. 2, the outer ends of the blades being tapered as shown at 21 and provided with the beveled marking edges 22.

A series of oppositely inclined, triangular blades 23 is carried by the die head 12, these blades being located between the sleeve head blades 19.

The blades 23 are located in grooves 24 provided in the periphery of the die head 12, the rear end of each blade having an angular notch 25 adapted to be received in the angular end 26 of the groove.

Beveled cutting edges 27 are formed upon the inclined edges of the blades 23, terminating in the flattened end portions 28, which are engaged by the flange 29, upon the retaining disk 30, attached to the end of the die head 12 as by a screw 31.

The tube 9 of the movable unit 4 is connected to a piston rod 32, provided with a suitable piston (not shown) located in the fluid cylinder 33. Fluid is admitted to the cylinder through a pipe 34 connected, through a two-way valve 35, with the pipes 36 leading to opposite ends of the cylinder 33.

In operating the machine to index or mark the ends of a sheet metal tube, the valve 35 is operated to slide the movable unit 4 toward the cylinder 33 a sufficient distance to permit the tube 37 to be placed between the indexing units 3 and 4.

The valve 35 is then operated to change the direction of movement of the piston, forcing the unit 4 longitudinally against the adjacent end of the tube while the opposite end of the tube is forced into the sleeve head of the indexing unit 3. The ends of the tube push the die head 12 outward, against the pressure of the springs 17 when the die head 12 internally engages an end of the tube at spaced intervals the edges 27 of the die head blades 23 marking the positions of the flutes in each end of the tube, the beveled edges of the sleeve head blades 19 externally engaging and depressing the ends of the tubes between these points as indicated in Fig. 4.

As both units 3 and 4 are mounted with all of the blades 19 and 23 in the same radial positions, it will be seen that both ends of the tube are simultaneously and correctly indexed or marked in a single operation properly locating the positions of the flutes which are to be formed in the tubular column.

I claim:

1. An indexing machine for sheet metal tubes including a pair of indexing units adapted to receive the ends of a tube, a series of radial blades within each unit provided with inclined edges and a second series of oppositely inclined radial blades located between the first named blades for uniformly marking the ends of the tube.

2. An indexing machine for sheet metal tubes including a pair of indexing units adapted to receive the ends of a tube, a series of radial blades within each unit provided with inclined edges, a second series of oppositely inclined radial blades located between the first named blades for uniformly marking the ends of the tube and means for moving one of the heads toward the other.

3. An indexing machine for sheet metal tubes including a pair of indexing units adapted to receive the ends of a tube, a series of radial blades within each unit provided with inclined edges and a second series of oppositely inclined radial blades slidably located between the first named blades for uniformly marking the ends of the tube.

4. An indexing machine for sheet metal tubes including a pair of indexing units adapted to receive the ends of a tube, a series of radial blades within each unit provided with inclined edges, a second series of oppositely inclined radial blades slidably located between the first named blades for uniformly marking the ends of the tube and means for moving one of the heads toward the other.

5. An indexing machine for sheet metal tubes including a pair of indexing units, each unit including longitudinally movable die means internally engaging the end of a tube at spaced intervals and means externally engaging and depressing the end of the tube between the die engagements.

6. An indexing machine for sheet metal tubes including a pair of indexing units, each unit including longitudinally movable die means internally engaging the end of a tube at spaced intervals and one unit including means externally engaging and depressing the end of the tube between the die engagements, and the other unit including longitudinally movable means externally engaging and depressing the end of the tube between the die engagements.

7. An indexing machine for sheet metal tubes including a pair of indexing units, each unit including a longitudinally movable die head internally engaging the end of a tube at spaced intervals and a sleeve head externally engaging and depressing the end of the tube between the die engagements.

8. An indexing machine for sheet metal tubes including a pair of indexing units, each unit including a longitudinally movable die head internally engaging the end of a tube at spaced intervals and a sleeve head externally engaging and depressing the end of the tube between the die engagements, and means for moving one of the units toward the other.

9. An indexing machine for sheet metal tubes including a pair of indexing units, each unit including a longitudinally movable die head internally engaging the end of a tube at spaced intervals and a sleeve head externally engaging and depressing the end of the tube between the die engagements, means for moving one of the units toward the other, and yielding means permitting relative movement between each die head and sleeve head.

10. An indexing machine for sheet metal tubes including a pair of indexing units, each unit including longitudinally movable radial die head blades internally engaging the end of a tube at spaced intervals and radial sleeve head blades externally engaging and depressing the end of the tube between the die blade engagements.

In testimony that I claim the above, I have hereunto subscribed my name.

EDMUND W. RIEMENSCHNEIDER.